(12) United States Patent
Wugofski (10) Patent No.: US 7,134,133 B1
(45) Date of Patent: Nov. 7, 2006

(54) METHOD, SYSTEM, AND SOFTWARE FOR CREATING AND UTILIZING BROADCAST ELECTRONIC PROGRAM GUIDE TEMPLATES

(75) Inventor: Theodore David Wugofski, Fort Worth, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/435,744

(22) Filed: Nov. 8, 1999

(51) Int. Cl.
*G06F 3/00* (2006.01)
*H04N 7/173* (2006.01)

(52) U.S. Cl. ............................ 725/39; 725/49; 725/54; 725/82; 725/93; 725/98

(58) Field of Classification Search ................... 725/39, 725/40, 49, 54, 82, 91, 92, 93, 98
See application file for complete search history.

(56) References Cited

U.S. PATENT DOCUMENTS

| | | | |
|---|---|---|---|
| 5,359,367 A | | 10/1994 | Stockill ...................... 348/552 |
| 5,420,923 A | * | 5/1995 | Beyers, II et al. |
| 5,559,549 A | | 9/1996 | Hendricks et al. ............. 348/6 |
| 5,617,565 A | | 4/1997 | Augenbraun et al. ....... 395/604 |
| 5,666,293 A | | 9/1997 | Metz et al. .............. 395/200.5 |
| 5,715,515 A | * | 2/1998 | Akins, III et al. |
| 5,734,853 A | * | 3/1998 | Hendricks et al. |
| 5,880,768 A | | 3/1999 | Lemmons et al. ............. 348/1 |
| 6,005,597 A | * | 12/1999 | Barrett et al. |
| 6,307,939 B1 | * | 10/2001 | Vigarie ....................... 380/210 |
| 6,453,471 B1 | * | 9/2002 | Klosterman .................. 725/41 |
| 6,542,518 B1 | * | 4/2003 | Miyazawa .................. 370/468 |
| 6,681,395 B1 | * | 1/2004 | Nishi .......................... 725/45 |
| 6,751,401 B1 | * | 6/2004 | Arai et al. ..................... 386/83 |
| 6,973,663 B1 | * | 12/2005 | Brown et al. ................. 725/39 |
| 2002/0199195 A1 | * | 12/2002 | Townsend et al. ............ 725/60 |

FOREIGN PATENT DOCUMENTS

| | | |
|---|---|---|
| EP | 0935393 A2 | 8/1999 |
| EP | 0940980 A2 | 9/1999 |
| WO | WO98/26584 | 6/1998 |

* cited by examiner

*Primary Examiner*—Kieu-Oanh Bui
(74) *Attorney, Agent, or Firm*—Scott Charles Richardson; McGrath, Gelssler, Olds, &

(57) ABSTRACT

A method, system and software for broadcasting, receiving, providing and/or configuring an electronic program guide (EPG). A broadcast station broadcasts a template to a system where program information is inserted into the broadcasted template, thereby creating a station specific EPG. The template accesses program information, service information, event information, user interface information, etc., for configuration and presentation of the EPG to the user. User interface assets and other associated information such as program information, tuning information, etc., may be accessed through a local data base or even through a broadcast signal containing the desired information. Event handling instructions are provided for selecting programs and events and accessing service information, tuning information, etc., for selected programs and events. Additionally, application program interfaces are accessible for execution, tuning, program, and scheduling information, etc. Templates are provided through a propagated signal wherein the signal may contain further information relating to channel information, user preference information, application information, return channel information, etc.

69 Claims, 8 Drawing Sheets

METHOD, SYSTEM, AND SOFTWARE FOR CREATING AND UTILIZING BROADCAST ELECTRONIC PROGRAM GUIDE TEMPLATES

FIELD OF THE INVENTION

The present invention relates generally to electronic program guides and, more particularly, to broadcasting electronic program guide templates.

BACKGROUND OF THE INVENTION

Electronic program guides (EPGs) provide consumers with a means of identifying services and events available through a television transport stream. EPGs may be embedded as applications in a DTV (digital television) receiver. These embedded EPGs are commonly tailored to the needs of the receiver manufacturer or, in the case of a cable system, the needs of the cable operator.

An alternative to embedded EPGs is to broadcast or insert a template that configures an EPG within the bandwidth of DTV channels. This strategy permits the broadcaster to tailor the EPG template to their needs, whether that be through branding, emphasizing their own content, or enhancing their revenue stream through advertising or additional data services.

With today's receivers, consumers may explore available programming through an embedded EPG. This embedded EPG rarely emphasizes the branding of one broadcaster over another, preferring to emphasize the manufacturer's branding over that of the current channel's broadcaster. With the broadcast EPG of the future, broadcasters will no longer have to relinquish control of how their branding and programming are delivered to the consumer. In addition, broadcasters will be able to emphasize current programming, what's on next, as well as big ticket events of the future. Additional revenue opportunities will be available to broadcasters using broadcast EPGs through the use of user-interactive links such as advertising, links to additional content, impulse purchase items, etc. Additionally, DTV receivers of the future will be able to download and execute applications delivered through the DTV transport stream.

What is needed is a system, method and software for providing additional electronic program guide information. The system should provide a customizable electronic program guide template capable of being inserted into a television transport stream. The electronic program guide template should be further enabled to call and execute applications, as well as provide an interface with which the user can interact.

SUMMARY OF THE INVENTION

Accordingly, the present invention provides a system for providing additional electronic program guide information comprising at least one template maintaining one or more instructions capable of configuring an electronic program guide.

The present invention also provides a method comprising maintaining at least one template having one or more instructions capable of configuring an electronic program guide and inserting the template into at least one information stream.

The present invention further provides a computer readable medium tangibly embodying a program of instructions for providing additional electronic program guide information, the program of instructions implementing at least one template comprising one or more instructions capable of configuring an electronic program guide.

It is an object of the present invention to enable broadcasters to utilize non-hardware specific electronic program guides.

It is another object of the present invention to provide a means of inserting local programming and data into a viewer's electronic program guide.

The present invention provides the advantage of reducing the signal bandwidth required for transmitting and receiving information for electronic program guides.

A further advantage of the present invention is to provide broadcast station customized electronic program guides without requiring event and service information.

Another advantage of the present invention is accessing, receiving, and executing applications using electronic program guides.

A further advantage of the present invention is that broadcasters will be able to control how programs are presented to consumers and can emphasize current programming, future programming and future premier events.

Another advantage of the present invention is the ability to provide user interactive links such as advertising, and links to additional content (i.e., biographies, filmographies, digital versatile disk content, etc.) within electronic program guides for generating additional revenue opportunities.

A further advantage of the present invention is that broadcast electronic program guides may be used as the primary means for broadcasters to manage consumers' viewing by providing a means for stations to brand programming, emphasize current and future events, insert revenue-enhancing local advertising, and provide links to other content.

Another advantage the present invention provides is the ability to access electronic program guide data and graphical user interface assets independent of the received electronic program guide template.

Another advantage of the present invention is the ability to provide periodically changing user interface assets displayed within an electronic program guide.

The present invention also provides the advantage of providing a means for a local station to emphasize their brand and content.

The present invention also provides the advantage of providing a means for local stations to enhance their revenue streams through advertising and other promotional insertions.

The present invention further provides the advantage of allowing electronic program guides to be broadcast independent of graphical user interface assets.

The present invention also provides the advantage of allowing the selection of elements for broadcast to be done manually or automatically based upon various decision criteria.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures.

DETAILED DESCRIPTION OF A PREFERRED EMBODIMENT OF THE INVENTION

In the following detailed description of preferred embodiments, reference is made to the accompanying drawings which form a part hereof, and in which is shown by way of illustration, specific preferred embodiments in which the invention may be practiced. These embodiments are described in sufficient detail to enable those skilled in the art to practice the invention, and it is to be understood that other embodiments may be utilized, and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
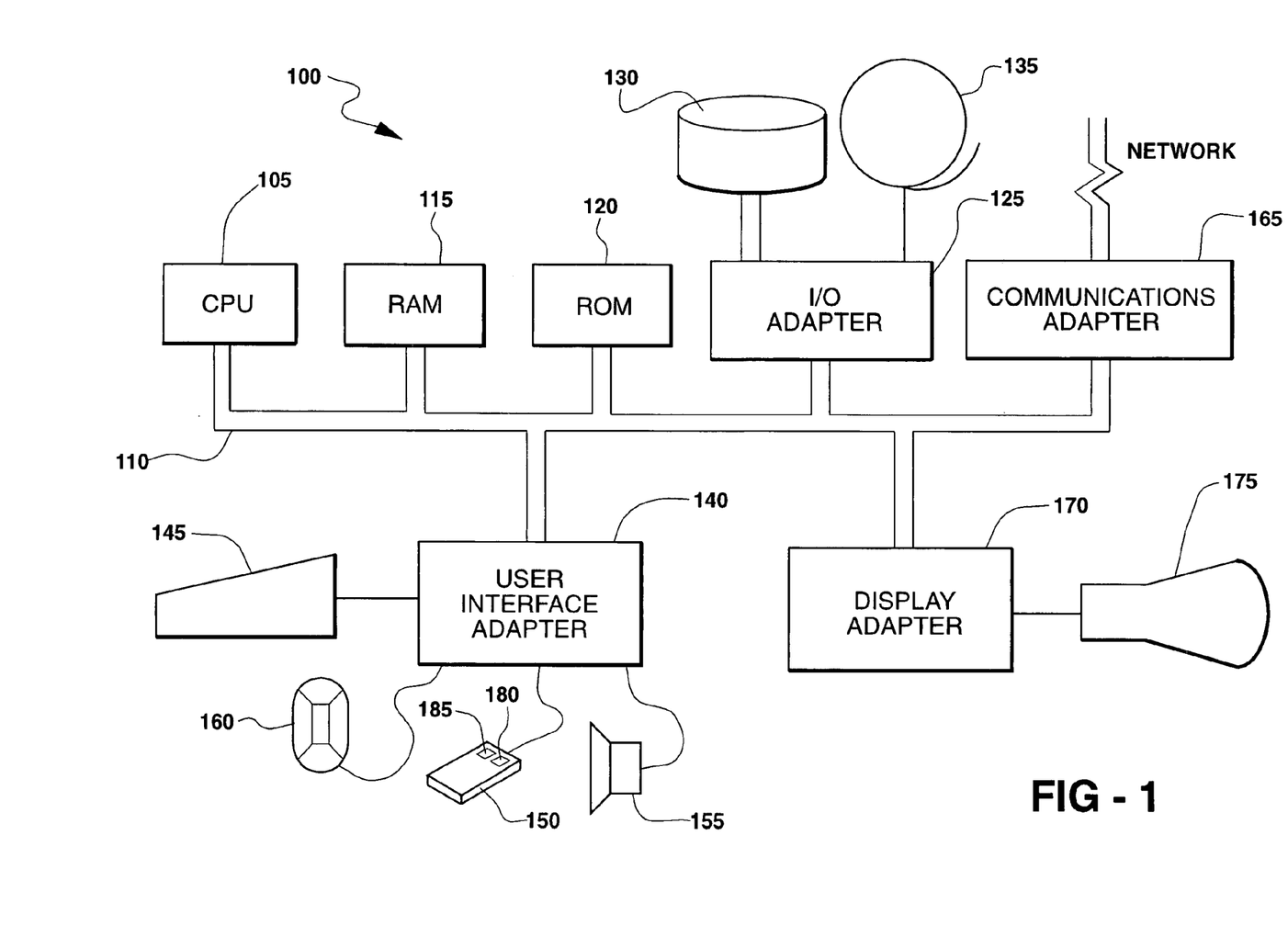
FIG. 1 illustrates a block diagram showing a computer system according to a preferred embodiment of the present invention.

A representative hardware environment for practicing the present invention is depicted in FIG. 1, which illustrates a typical hardware configuration of an information handling system 100 in accordance with the present invention, having a central processing unit (CPU) 105, such as a conventional microprocessor, and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read only memory (ROM) 120, an input/output (I/O) adapter 125 for connecting peripheral devices such as a disk unit 130 and a tape drive 135 to system bus 110, a user interface adapter 140 for connecting a keyboard 145, a mouse 150, a speaker 155, a microphone 160 (and/or other user interface devices to system bus 110), a communications adapter 165 for connecting information handling system 100 to an information network such as the Internet, and a display adapter 170 for connecting system bus 110 to a display device such as a monitor 175. The mouse 150 typically has a first button and a second button, 180 and 185 respectively, and is used to control a cursor (not shown) displayed on the monitor 175.

Figure 2:
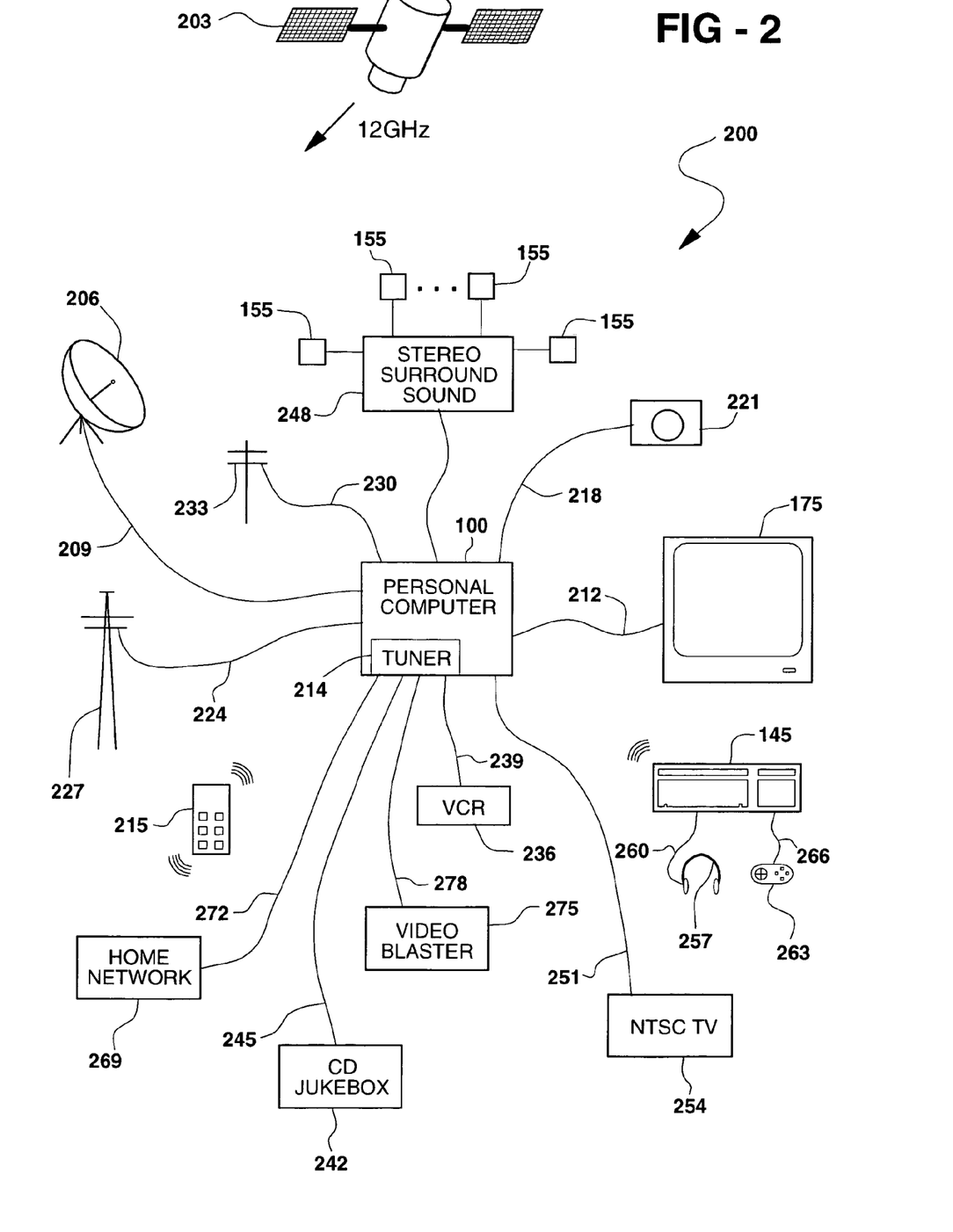
FIG. 2 illustrates a block diagram showing a convergence system according to a preferred embodiment of the present invention.

Referring next to FIG. 2, a home entertainment or convergence system, such as the Gateway Destination System mentioned above, is shown generally at 200. Reference numerals or letters in FIG. 2 which are like, similar, or identical to the reference numerals or letters of FIG. 1 indicate like, similar, or identical components or features. External to convergence system 200, is satellite 203, which in one preferred embodiment is an HS601 model, operated by Hughes at a 101 degree west longitude geosynchronous orbital location, transmits signals comprising 150 channels of modulated digital video, audio, and data at a frequency of about 12 GHz. The satellite signals are received by home entertainment system 200 through antenna 206 containing a low noise block converter amplifier. Antenna 206 is preferably about 18 inches in diameter and receives left and right hand circularly polarized signals between 12.2 and 12.7 GHz. Antenna 206 provides a "downconverted-spectrum" signal between 950 and 1450 MHz via a coaxial cable or other suitable communication medium 209 to information handling system 100, such as a personal computer or other system or circuitry capable of processing data. Suitable antennas 206 are already being manufactured and sold by RCA Corporation via direct sales and through numerous major retail chains such as Radio Shack.

System 100 contains circuitry and software to further process signals from the antenna, generally demodulating and decoding the signal to produce a VGA (video graphics adapter) signal. The VGA signal is provided via a standard VGA compatible monitor cable to drive a large screen data quality monitor 175 which is suitable for viewing in a family room or entertainment room environment. System 100 provides for user input by means of remote controls 215 and 145. Remote control 215 comprises a handheld size device with standard television controls and a numeric keypad, and in one embodiment, VCR (video cassette recorder) controls and a pointing device. It provides RF (radio frequency) or IR (infrared) control signals received by system 100. Remote control 145 is a full function personal computer keyboard with additional standard television and VCR controls, a pointing device which is preferably in the form of a touchpad, and it also provides RF control signals to system 100. RF control signals were selected over IR control signals or hardwired connections in one embodiment due to its benefits in a home entertainment environment. RF control allows the system to be in a different room from monitor 175, or if in the same room, a clear line of sight is not required. In another embodiment, IR control signals were selected because the standard circuitry is available at a low cost. Monitor cable 212 is a standard type cable typically used on VGA display devices, and comprises up to fifteen electrical conductors, interfacing with monitor 175 in a D-series shell connector. In one embodiment, full multi-media sourcing and destinationing of audio/video/data (A/V/D) broadcast is provided for.

Information handling system 100 may include a tuner 214, tuner circuitry, or card capable of both tuning to multiple channels and receiving television information or signals in the form of the NTSC (National Television Standards Committee) or PAL (Phase Alteration Line) forms, from any medium such as from a cable system or from a digital satellite system. One embodiment of the signal on cable 209 from satellite dish 206 provides digital A/V/D signals from such sources as DirecTV or Primestar (DirecTV and Primestar are trademarks of their respective companies). In another such embodiment, the signal on cable 209 provides analog A/V such as NTSC (National Television Systems Committee) antenna signals. In another such embodiment, the signal on cable 218 from camera 221 provides analog A/V such as NTSC audio/video signals. In further embodiments, the signal on cable 224 from cable-data source 227 provides analog and/or digital A/V/D. In further such embodiments, the signal on cable 230, from PSTN (Public Switched Telephone Network) 233, provides data or phone signals such as ISDN (integrated services digital network) or POTS (plain old telephone system) signals. In one set of such embodiments, system 100 is programmed to automatically record analog signals, such as television programming, onto recordable media, such as a video tape in VCR 236 coupled to cable 239. In another such set of embodiments, system 100 is programmed to automatically record digital signals, such as digital television programming or CD-ROM (Compact Disk—Read Only Memory) type audio, onto recordable media, such as recordable compact disks, in CD jukebox 242 coupled to cable 245. CD jukebox 242 also plays CDs or CD-ROMs for use elsewhere. In another such embodiment, signals are sent to stereo surround sound system 248 for audio output to one or more speakers 155, and on cable 251 to TV 254. In one such embodiment, earphones 257 on cable 260 and gamepad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 266 are examples of cables that may be wired coupling or wireless, such as RF or IR.

One example of convergence system 200 is the Destination System using the DestiVu user interface manufactured and sold by Gateway, Inc. In this manner, convergence system 200 is a fully functional computer integrated with a television, providing TV viewing (via broadcast, cable, satellite, VCR, digital disk, or other broadcast media) and personal computing functionality. This convergence of computer and television enables a user the combined access to both television programs and information, as well as computer related functionality such as computer information and programs, and Internet access.

Although many of today's televisions employ much of the same hardware resources employed by computers, such as information handling system 100, it is possible that the present invention might be practiced in other electronic devices or in networked electronic devices. For example, with the development of audio/video networking, such as the recently proposed HAVi standard, television sets or other audio/video devices such as audio/video receivers and VCRs that do not themselves contain certain resources, could implement the present invention by utilizing the resources of other devices on a network.

Figure 3:
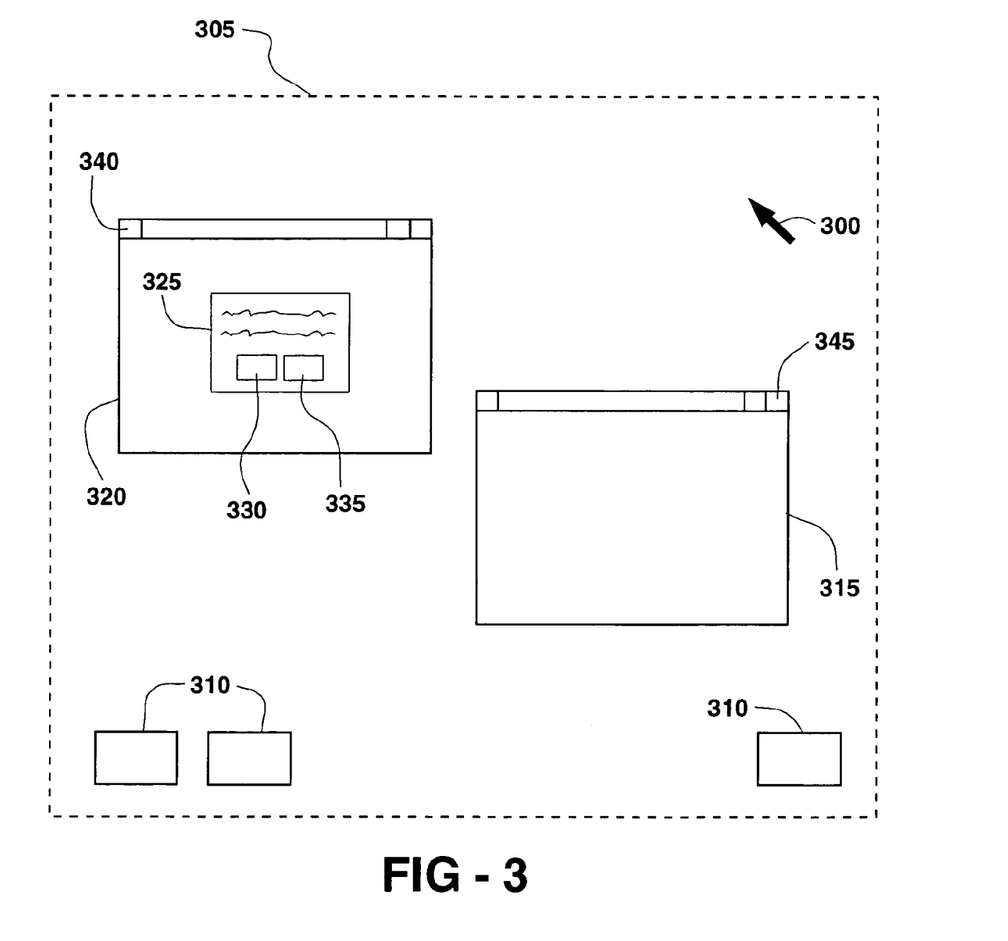
FIG. 3 shows a "desktop" of a computer operating system's user interface, typically employed on a computer system, as shown in FIGS. 1 and 2, according to a preferred embodiment of the present invention.

Referring next to FIG. 3, a detail of an operating system's graphical user interface, or GUI, as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is IBM's OS/2 (OS/2 is a trademark of International Business Machines Corporation). However, the present invention will work with DestiVu, Windows 98, Windows 95 (DestiVu is a trademark of Gateway, Inc. and Windows 98 and Windows 95 are trademarks of Microsoft Corporation), or any other graphical user interface. This GUI includes cursor 300, desktop 305, three icons 310, a first and a second window, 315 and 320 respectively, and a dialog box 325, all of which are well known in the art. Dialog box 325 further contains a first button and a second button, 330 and 335 respectively. Programs are represented by the graphical user interface as either icons 310 or windows 315 and 320. The horizontal region along the top of the windows are a first title bar and a second title bar, 340 and 345 respectively. A program window 315 or 320 has the "focus" when it has been designated by a user or by an operating system to receive input from keyboard 145 or mouse 150. In OS/2, the user gives the window focus by clicking a mouse button, 180 or 185, when cursor 300 is inside that window. Some operating systems, however, give a window the focus merely whenever cursor 300 is present within that window. The operating system typically indicates which program has the focus by changing the color of the focused window's title bar 340 or 345.

The present invention, in a preferred embodiment, is implemented as a program of instructions and therefore the following detailed description illustrates this implementation. It is understood that many different modules and many different sequences of code can be implemented to achieve the functions detailed herein, as well as the possibility of and/or for generating hardware specific coding, allowing for the optimization of specific hardware resources. With this in mind, the following detailed description avoids discussing any specific modules or sequences of code and relies only on detailing the functions by which the present invention, in a preferred embodiment, may be practiced.

Before discussing the present invention's template insertion methods, it is first necessary to discuss the background and inner workings of a broadcast template for configuring an electronic program guide (EPG). With today's receivers, consumers may explore available programming through an embedded EPG where the embedded EPG seldom emphasizes one broadcaster over another, preferring to emphasize the manufacturer's or provider's brand over that of the current channel's broadcaster. In a preferred embodiment, however, a DTV receiver downloads and executes applications delivered through a broadcast signal for broadcast stations. Through the utilization of broadcast templates for EPGs, broadcasters no longer have to relinquish control of how EPGs present program information to consumers. The present invention enables broadcasters to emphasize current programming, what program airs next, and big ticket events in the future. Further, broadcasters can also place advertising within their guide and links to additional content (biographies, filmographies, and other content similar to that in DVD titles). These user-interactive links can generate additional revenue opportunities in terms of advertising and impulse purchases.

In a preferred embodiment, broadcast templates may contain presentation information to identify a broadcaster's name and network affiliation, local advertising, and links to additional content. Application Program Interface (API) calls are placed in the EPG template for accessing event information at run-time on the DTV receiver. When the EPG template application is called and executed on the DTV receiver, it makes the appropriate function calls on the DTV receiver, accessing the receiver's PSIP (Program and System Information Protocol) information to be added to the EPG template. Similar to an embedded EPG, the broadcast EPG templates may be interactive. Through the ATSC-defined APIs, the user is able to perform such EPG functions as selecting programs for viewing, recording programs, etc.

The broadcast EPG template is the primary means for station broadcasters to manage their consumers' viewing through the branding of their EPG template and information accessed within. Such branding may include emphasizing current and future events, inserting revenue-enhancing local advertising, and providing links to other content. The broadcast EPG template also provides access to return channels within DTV receivers providing access to transaction based services, enhancing the revenue of the broadcaster, and possibly the broadcast EPG template developer. As return channels in DTV receivers proliferate, return channels accessed by broadcast EPG templates may serve as a navigator to local advertisers and pay services.

In a preferred embodiment, the system, such as convergence system 200 of FIG. 2, receives signals comprising at least one template comprising one or more instructions for configuring an EPG. The template information is multiplexed in a digital TV signal. Due to the voluminous nature of EPG data and the potential redundancy of downloaded data, the broadcast template and associated information excludes EPG data, but may contain graphical user interface assets like bitmaps, audio, etc. The template and associated information are encoded within a broadcast signal. They are likely to be in the form of a declarative language that is processed by a data driven software application. They may also be procedural programs that access the receiver's Application Program Interfaces (APIs). In other embodiments, information for the templates (i.e., asset, user interface, tuning information, program information, etc.) may be separately accessed by the receiver to obtain the desired information. This information may be obtained in a plurality of ways, such as tuning in to the appropriate station frequencies or in other embodiments, periodically tuning in to the network frequencies to access and store the information in a database, where, upon request, the data may be accessed by the template for viewing by the user. Therefore, broadcast EPG templates possess all the characteristics of current electronic program guides, thus allowing users to access programs or events, schedule recordings, schedule reminders, etc. For example, upon a user selecting an event from an EPG created using a broadcast EPG template, the EPG queries service information from the service information APIs and subsequently accesses the appropriate tuning APIs for the user to view the selected events.

Figure 4:
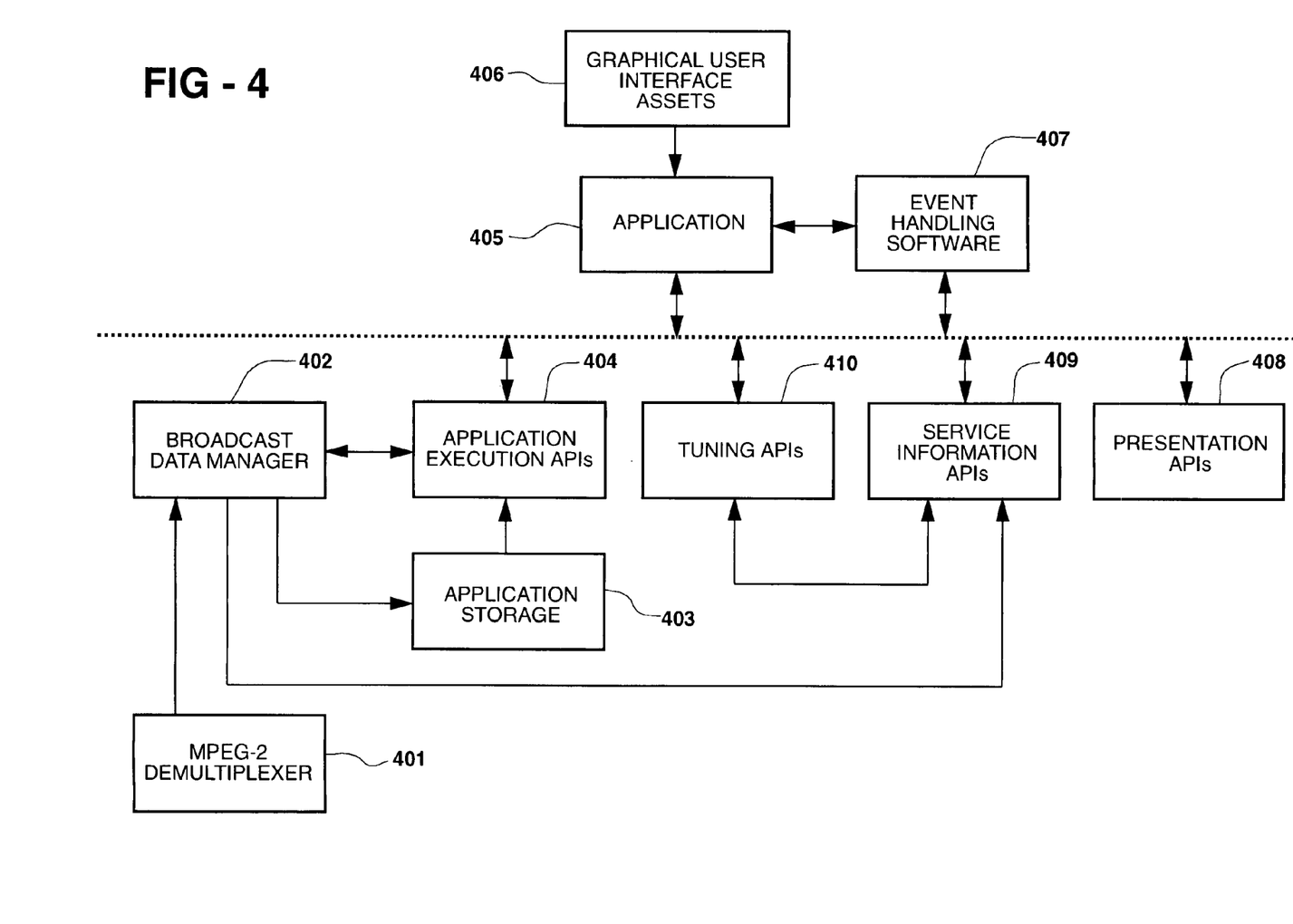
FIG. 4 shows an illustration of a block diagram of an electronic program guide system according to a preferred embodiment of the present invention.

Referring now to FIG. 4, a block diagram of an electronic program guide system according to a preferred embodiment of the present invention is shown. System 100/200 contains a receiver configured to receive a DTV broadcast signal. The DTV broadcast signal is fed through a series of down converters and demodulators and supplied to an ATSC compliant HDTV transport decoder and demultiplexer. The signal is then sent to MPEG-2 demultiplexer module 401 to extract the data elementary streams that contain audio, video, and other data elementary content. The data elementary streams may contain information related to one or more APIs.

After extraction, the data elementary streams are then transported to broadcast data manager module 402. An application received by the system via a broadcast signal is capable of calling a function, or an application programming interface (API) as represented by an application execution APIs module 404. In other words, the application execution APIs module 404 is capable of running the application received via the broadcast signal. If the broadcasted application is not executed, or run, immediately, then the application may be stored in application storage module 403. Furthermore, as shown and discussed with reference to FIG. 5 below, if the application has persistent data, such as an electronic program guide database 504 or a service and tuning data database 505, the application may also be stored in the application storage module 403.

Tuning APIs module 410 contains the extracted data elementary stream content related to enabling the receiver to tune to various station and program broadcast frequencies. Service information APIs module 409 is used in conjunction with tuning APIs module 410 to present available station programming upon request. Service information APIs module 409 contains information for the various networks, or broadcast stations, and services received by system 100/200 such as ABC, CBS, CNN, Pay-Per-View Information, Broadcast Internet information, URLs, etc., and program information associated with the available stations and services. Presentation APIs module 408 contains user interface information and/or assets such as graphics, audio, etc., for creating a user interface to be displayed within the EPG. The user interface information and/or assets can each be uniquely configured with respect to each broadcast station. Application module 405 contains at least one EPG application for displaying an EPG that accesses a plurality of resources to create the EPG. One such resource is graphical user interface assets module 406. Graphical user interface assets module 406 contains additional information for each of the networks or broadcast stations such as graphics, station advertisements, banners, pay-per-view information, and other value-added information. Upon execution, application module 405 displays a graphical user interface comprising a combination of graphical user interface assets obtained from graphical user interface module 406, presentation information from presentation API 408, as well as rendered text extracted from service information APIs module 409.

Event handling software module 407 is used to handle events, wherein the term "event" is meant to refer to things that occur when a user performs an action (such as making a selection with a mouse or remote control), or when external events occur (such as when the time changes from 8:59 pm to 9:00 pm), or when scheduled "events" occur (such as when a television program begins). Tuning and service information are delivered through service information APIs module 409 and tuning APIs module 410 to provide the user with the most current event information available for a selected event.

Figure 5:
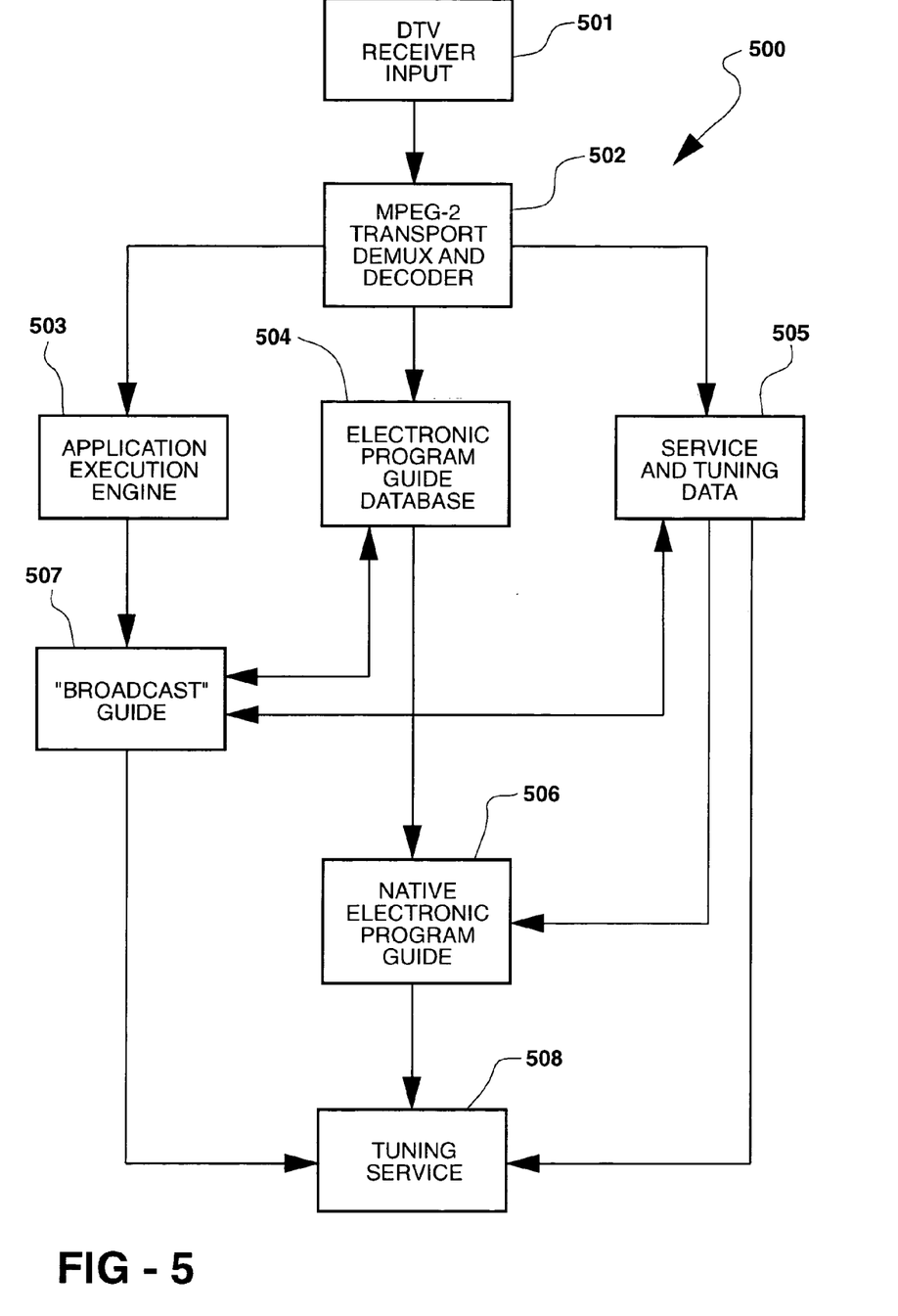
FIG. 5 shows an illustration of a system for receiving electronic program guide templates according to a preferred embodiment of the present invention.

Referring now to FIG. 5, a block diagram of a receiver 500 according to one embodiment of the present invention is shown. Receiver 500 is configured to receive a propagated signal comprising information associated with an EPG. Receiver 500 is also capable of modifying the received information such that received information can be used with an electronic program guide native to receiver 500 or with an EPG configured by a broadcast template received by receiver 500.

Receiver 500 can be included with system 100/200 and configured to receive a DTV broadcast signal. Receiver 500 includes a DTV receiver input 501 for receiving the DTV broadcast signal. DTV receiver input 501 is configured to receive and demodulate MPEG-2 transport streams by sending the MPEG-2 transport streams to an MPEG-2 transport demultiplexer and decoder 502. MPEG-2 transport demultiplexer and decoder 502 splits the DTV broadcast signal into its audio, video, and data components. If one of the data components is an application, that data component is transferred to application execution engine 503. If the data component is service and tuning information, that data component is transferred to service and tuning data 505 module. If the data component is EPG information such as event information, graphics, etc., that data component is transferred to electronic program guide database 504. In a preferred embodiment, the various data components are stored separately within receiver 500. The data components stored in EPG database 504 and service and tuning data module 505 is made available to any native electronic program guide 506 resident on receiver 500. Broadcast EPG 507, received with the DTV broadcast signal by receiver 500, is configured to access the information within EPG database 504. In one embodiment of the present invention, broadcast EPG 507 is capable of modifying the information in EPG database 504 and service and tuning module 505 before its utilization in native EPG 506. Additionally, any application, whether broadcast or native to receiver 500, can access the information stored within EPG database 504. Broadcast EPG 507 and native EPG 506 utilize tuning service 508 and information stored within service and tuning data module 505 to enable receiver 500 to tune to selected events.

In an alternate embodiment of the present invention, Receiver 500 further comprises EPG database 504 for storing EPG information. Receiver 500 comprises DTV Receiver Input 501 configured to receive a broadcast EPG for selectively modifying the EPG information stored within EPG database 504. Receiver 500 is configured to receive and store broadcast EPG information. Broadcast EPG 507 is received by Receiver 500 and configured to access information stored within EPG database 504.

In one embodiment of the present invention, EPG information comprises private EPG information. Private EPG information is information intended for use by select EPGs. Private event information can include many types of information such as elaborate event descriptions, local affiliate information, user selectable information, etc. For example, suppose NBC broadcasted EPG assets they did not want other broadcast EPGs, such as ABC, CBS, etc., to have access to. Private event information can be stored within system 100/200 to ensure that accurate, up-to-date information is available to the select EPGs.

Figure 6:
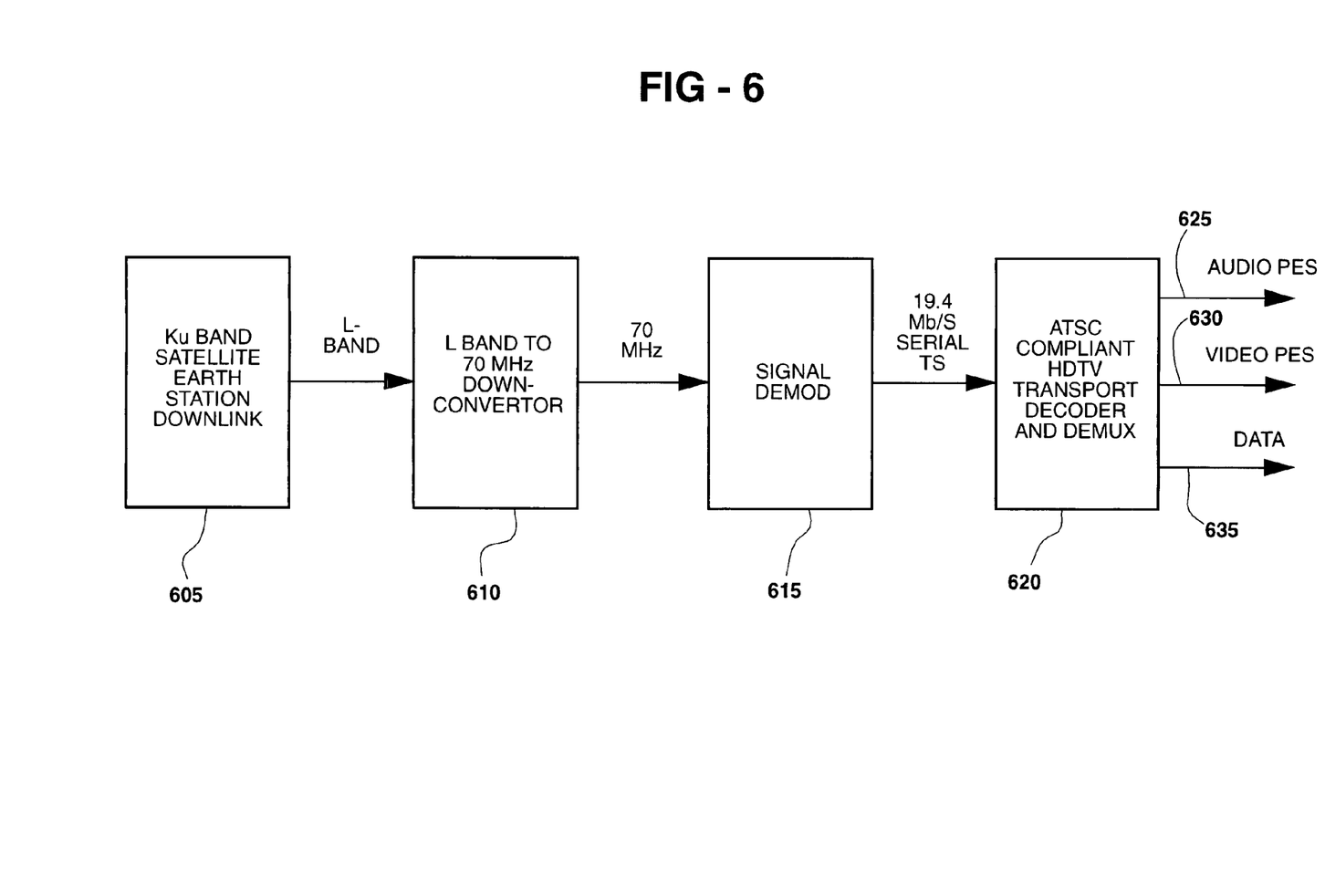
FIG. 6 illustrates a block diagram indicating a means by which a local broadcaster receives a national programming feed according to a preferred embodiment of the present invention.

To begin detailing the present invention's methods for inserting the above detailed templates for configuring an EPG into an information stream, it is first necessary to discuss how the information stream is received. Referring now to FIG. 6, a block diagram illustrating the means by which local affiliate stations receive national programming feeds is shown according to a preferred embodiment of the present invention. Local affiliate stations typically receive the national programming feed via Ku-Band satellite transmissions 605. Through a series of down converters 610 and signal demodulators 615, the national programming feed is supplied to an ATSC (Advanced Television Systems Committee) compliant HDTV (High Definition Television) transport stream decoder and de-multiplexer 620. The transport stream decoder and de-multiplexer 620 splits the demodulated national programming feed into its elementary audio 625, video 630, and information 635 streams. This break down permits local affiliates to exchange nationally originated material with locally originated material.

Figure 7:
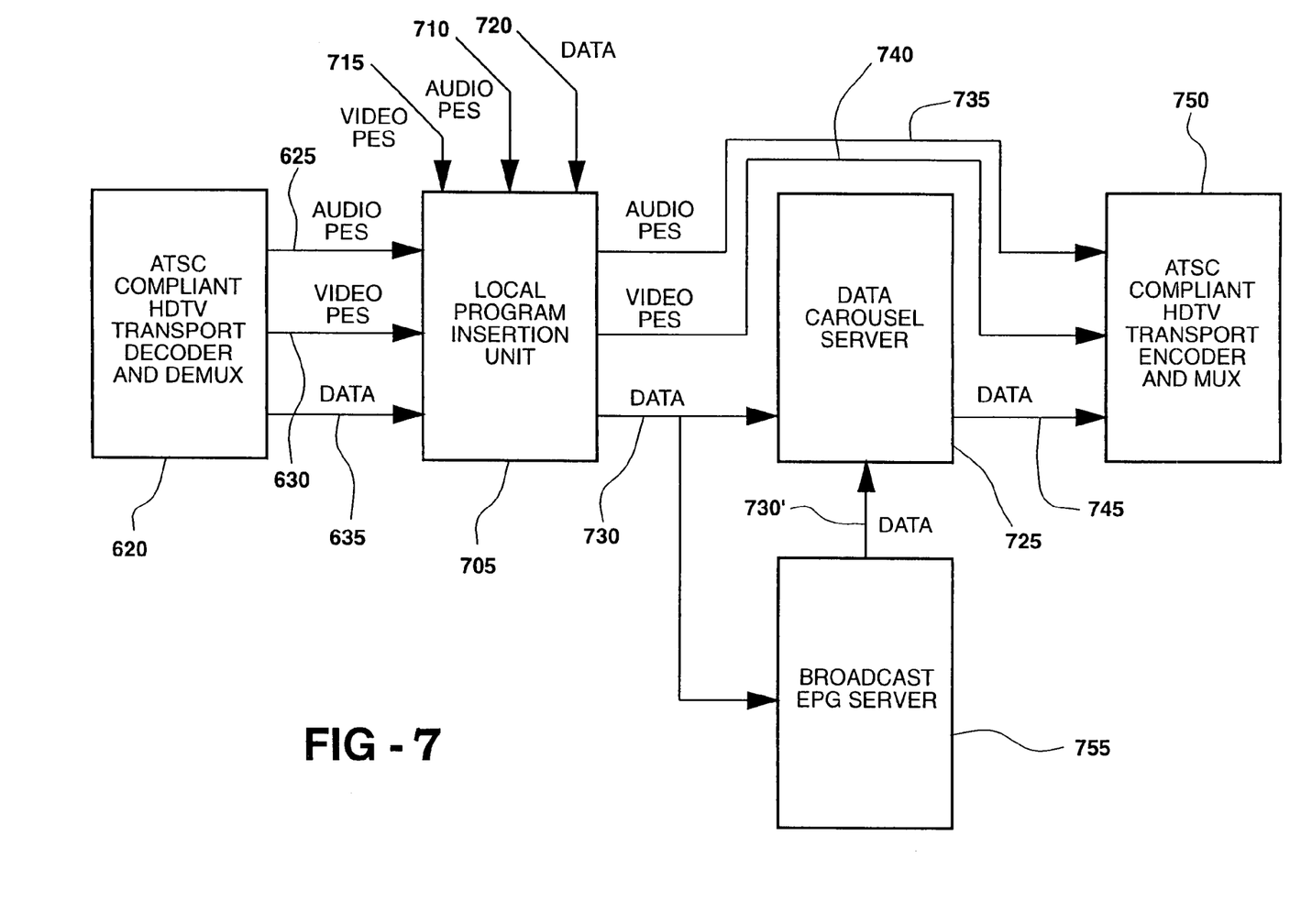
FIG. 7 illustrates a block diagram indicating a means for inserting local programming and data into a data stream according to a preferred embodiment of the present invention.

With the information stream 635 separated from the TV broadcast, a local affiliate can now swap nationally originated material with locally originated material before recombining the streams and re-broadcasting the DTV signal. Referring now to FIG. 7, a block diagram illustrating a method and typical hardware components for inserting local programming and local information into an information stream is shown. As mentioned above, the transport stream decoder and de-multiplexer 620 splits the demodulated national feed into its real time audio 625, video 630, and information 635 streams. Local program insertion unit 705 is configured to replace nationally originated audio 625 and video 630 elementary streams with locally originated audio 710 and video 715 elementary streams. In a preferred embodiment, PSIP (Program and System Information Protocol) information 720 can also be modified by local program insertion unit 705. It is to be understood that the SI (System Information) protocol promulgated by DVB, as an alternative to the ATSC's PSIP approach, may be utilized. The locally originated audio 710 and video 715 elementary streams may be encoded from NTSC sources or locally originated HDTV sources, such as in-station studios. A data carousel server 725 allows the local station to introduce locally originated information or data services 730. The resulting audio 735, video 740, and information 745 streams are then fed to an ATSC compliant transport encoder and multiplexer 750.

One type of information service 730 that can be added to the transport system is a broadcast template for configuring an electronic program guide (EPG). An EPG configured by a broadcast template is different from a typical EPG embedded in a receiver in that it can be readily branded by a local affiliate and can include other content specific to the local affiliate such as local advertising and local data service options. This broadcast template will be fed to data carousel server 725 by broadcast EPG server 755. Broadcast EPG server 755 can be a system like information handling system 100 or a similarly enabled device.

Figure 8:
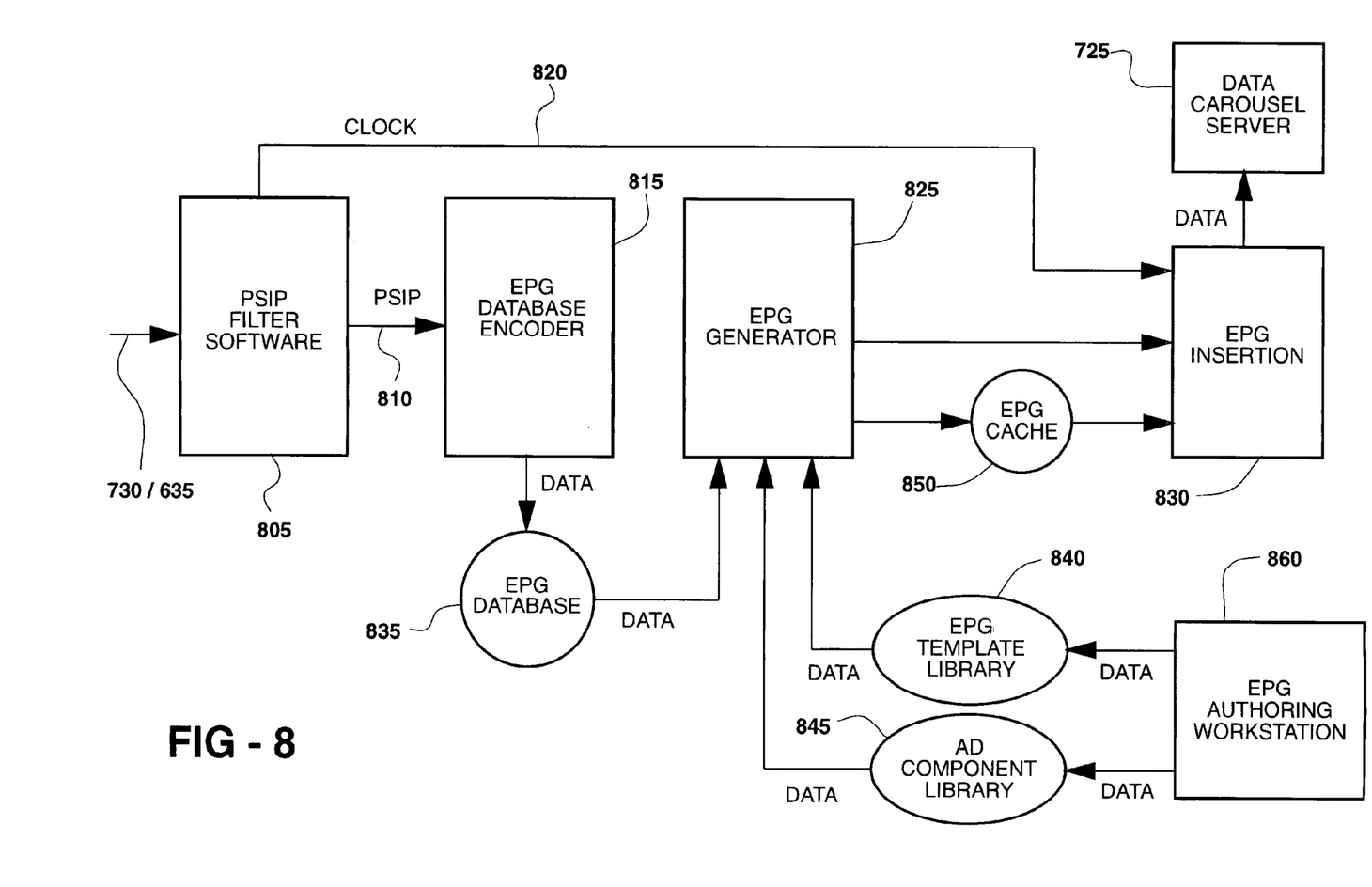
FIG. 8 illustrates a block diagram indicating a method for inserting a broadcast electronic program guide template into a data stream according to a preferred embodiment of the present invention.

Referring now to FIG. 8, a block diagram illustrating the inner workings of broadcast EPG server 755 implementing a method for inserting a broadcast template for configuring an EPG into an information stream is shown. Broadcast EPG server 755 provides a broadcast template to data carousel server 725. Information stream 730 from local program insertion unit 705, or information stream 635 from transport decoder and de-multiplexer 620 if there is no local program insertion unit 705, is fed to PSIP filter software 805. PSIP filter software 805 extracts the real time PSIP information from the remaining system information and data services. The filtered PSIP 810 is provided to an EPG database encoder 815. EPG database encoder 815 translates and stores PSIP information 810 into database 835, most likely a relational database. PSIP software 805 also extracts the clock signal 820 from information stream 730 and sends this clock signal 820 to EPG generator 825 and EPG insertion component 830.

At periodic intervals, clock signal 820 triggers EPG generator 825 to format a new electronic program guide for insertion. The EPG is formatted using the above described templates available in EPG template library database 840 in conjunction with or based upon components of the encoded PSIP information in EPG database 835. The templates contain logic and declarations that enable the formatting of the EPG's presentation using information in EPG database 835. EPG generator 825 also allows for the insertion of advertising and other non-EPG content, such as GUI assets indicative of a network's local affiliate, local advertisements, etc., into the broadcast template. This content is made available by GUI asset library 845 and formatted according to the current template. EPG generator 825 either stores the template in cache 850 for later insertion into data carousel server 725, or it sends it directly to EPG template insertion unit 830.

At periodic intervals, clock signal 820 triggers EPG insertion unit 830 to add or replace the template in data carousel server 725 and to subsequently insert the template into the broadcast information stream. EPG insertion unit 830 can also be configured to insert local assets, such as advertisements or GUI assets, into data carousel server 725 for broadcast. This additional insertion can be performed in conjunction with, or independent of, the template's insertion into data carousel server 725 or into the information stream. EPG authoring workstation 860 is included to allow local affiliates to manually create templates for broadcasting instead of relying on clock signal 820 to correlate program or service information, etc., and EPG database 835 to automatically create templates. The above detailed description references several methods of automating the template related functions herein. As anticipated by the present invention, the methods of automation are numerous and automation itself is optional.

Accordingly, the present invention comprises a method, system, signal, receiver and software for receiving templates, as well as broadcast electronic program guides and electronic program guide information for configuring an Electronic Program Guide (EPG). A broadcast signal is received by a system where the signal contains information for the template and wherein the template is registered with the receiver upon being received. The information accessible by the template includes programs, service, event, tuning, user interface, application, interactive, and user preference information contained within the received signal. Application Program Interfaces (APIs) are used to provide the above information and to further provide information for displaying and configuring EPGs and user interfaces contained therein. APIs contained within the system consist of application execution APIs, tuning APIs, program and service information APIs, and user interface APIs. Event handler software is used to access event information contained within the APIs and may further be used to access program information, schedule recordings, schedule reminders, etc. The template further comprises desired station information, user interface assets, and event information that may change periodically throughout the day. Also accessible by the template is user interactive data allowing users to access additional event information and return channels for Internet access. The template may also include user preference information such as favorite programs, networks, web addresses, etc.

Additionally, the present invention provides for automatic generation of templates for configuring EPGs for insertion into a broadcast information stream. A nationally broadcast television signal is filtered to allow for local affiliate information, video, and audio insertion. The remaining information is sent to an EPG database encoder and then to an EPG database for later use. In the automated version of the present invention, a signal of some sort, such as a clock signal received with the national feed, is utilized to draw this information from the EPG database into an EPG generator. The EPG generator uses this information, a template from an EPG template library database along with assets from a GUI asset database to generate a local affiliate specific template for broadcast. This template is then sent to the user immediately or as a result of some automating signal. The present invention also provides a workstation, drawing on the same resources, allowing for the manual generation of local affiliate specific templates for broadcast.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–8. Until required by the computer system, the set of instructions may be stored in another computer readable memory; for example, in a hard disk drive, or in a removable memory such as an optical disk for eventual use in a CD-ROM drive, or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A system for providing additional electronic program guide information comprising:
    a first input configured to receive electronic program guide information from a first broadcaster;
    a second input configured to receive private electronic guide information from a second broadcaster;
    at least one template comprising one or more instructions capable of configuring an electronic program guide to include the electronic program guide information, the private electronic program guide information and the additional electronic program guide information; and
    a broadcast electronic program guide server and a data carousel server, the broadcast electronic program guide server transmitting the template to the data carousel server;
    wherein the private electronic program guide information includes at least one of event descriptions, local affiliate information or user selectable information and is intended for use exclusively by one or more select electronic program guides.

2. The system, as claimed in claim 1, wherein said template further comprises at least one instruction capable of accessing information.

3. The system, as claimed in claim 1, wherein said template further comprises at least one instruction capable of registering said template with a receiver.

4. The system, as claimed in claim 1, wherein said template further comprises at least one instruction capable of maintaining a user interface for said electronic program guide.

5. The system, as claimed in claim 1, wherein said template further comprises event handling instructions capable of selecting an event from a plurality of events.

6. The system, as claimed in claim 1, wherein said template further comprises at least one instruction capable of calling at least one application programming interface.

7. The system, as claimed in claim 1, wherein said system further comprises a receiver configured to receive said at least one template.

8. The system, as claimed in claim 7, wherein said receiver is further capable of maintaining information.

9. The system, as claimed in claim 7, wherein said receiver is further capable of receiving at least one template from one network of a plurality of networks and at least a second template from a second network of the plurality of networks.

10. The system, as claimed in claim 7, wherein said receiver is further capable of receiving user interface information independent of said at least one template.

11. The system, as claimed in claim 1, further comprising:
a server comprising:
at least one processor;
memory operably associated with said processor; and
at least one insertion module operably associated with said processor and said memory and capable of inserting said at least one template comprising one or more instructions capable of configuring an electronic program guide into at least one information stream.

12. The system, as claimed in claim 11, wherein said server further comprises at least one selection module operably associated with said processor and said memory and capable of selecting said at least one template.

13. The system, as claimed in claim 11, wherein said insertion module is further capable of inserting at least one graphical user interface asset into said at least one information stream.

14. The system, as claimed in claim 13, further comprising at least one storing module capable of storing said at least one template and said at least one graphical user interface asset prior to insertion of said at least one template and said at least one graphical user interface asset into said at least one information stream.

15. The system, as claimed in claim 13, wherein said server further comprises at least one generation module operably associated with said processor and said memory and capable of generating an electronic program guide based upon said at least one template and said at least one graphical user interface asset.

16. The system, as claimed in claim 13, wherein said server further comprises at least one selection module operably associated with said processor and said memory and capable of selecting said at least one graphical user interface asset.

17. The system, as claimed in claim 11, wherein said insertion module is further capable of inserting said at least one template into one of a plurality of channels contained in at least one signal corresponding to one of a plurality of broadcasters.

18. The system, as claimed in claim 11, further comprising at least one splitting module capable of splitting at least one information signal into at least one elementary information stream.

19. The system, as claimed in claim 18, further comprising at least one replacing module capable of replacing said at least one elementary information stream with at least one locally generated elementary information stream.

20. The system, as claimed in claim 18, further comprising at least one encoding module capable of encoding said at least one elementary information stream into at least one information stream for output.

21. The system, as claimed in claim 11, further comprising at least one introducing module capable of introducing at least one locally generated data service into said at least one information stream.

22. The system, as claimed in claim 1, further comprising at least one creation module capable of creating said at least one template.

23. The system of claim 1, wherein the template includes an electronic program guide template application.

24. The system of claim 23, further comprising a local program insertion unit, a transport decoder and demultiplexer, and a transport encoder and multiplexer, the transport decoder and demultiplexer splits a national feed into real time audio, real time video, and information streams, the local program insert unit replaces national feed video and audio with locally originated audio and video elementary streams and provides the information streams to the broadcast electronic program guide server and the data carousel server, and the transport encode and multiplexer receiving audio and video streams from the local program insertion unit and information streams from the data carousel server.

25. The system, as claimed in claim 1, wherein the first broadcaster is a national broadcaster and the second broadcaster is a local affiliate.

26. The system, as claimed in claim 1, further comprising:
transport encoder means for encoding the electronic program guide information and the private electronic guide information into a television signal suitable for transmission to a television receiver.

27. The system, as claimed in claim 26, wherein the television signal encoded with the electronic program guide information and the private electronic guide information is transmitted via a satellite or via a cable television system.

28. A method comprising:
receiving electronic program guide information from a first broadcaster via a first input;
receiving private electronic guide information from a second broadcaster via a second input;
maintaining at least one template in a broadcast electronic program guide server, the at least one template comprising one or more instructions capable of configuring an electronic program guide; and
inserting said at least one template into at least one information stream and transmitting the information stream including the template to a data carousel server;
wherein the electronic program guide includes the private electronic program guide information that is intended for use exclusively by one or more select electronic program guides, the private electronic program guide information including at least one of event descriptions, local affiliate information or user selectable information.

29. The method, as claimed in claim 28, further comprising selecting said at least one template.

30. The method, as claimed in claim 28, further comprising creating said at least one template.

31. The method, as claimed in claim 28, further comprising inserting at least one graphical user interface asset into said at least one information stream.

32. The method, as claimed in claim 31, further comprising selecting said at least one graphical user interface asset.

33. The method, as claimed in claim 31, further comprising generating an electronic program guide based upon said at least one graphical user interface asset and said at least one template.

34. The method, as claimed in claim 31, further comprising storing said at least one template and said at least one graphical user interface asset prior to inserting said at least one template and said at least one graphical user interface asset into said at least one information stream.

35. The method, as claimed in claim 28, wherein inserting further comprises inserting said at least one template into one of a plurality of channels of at least one signal corresponding to one of a plurality of broadcasters.

36. The method, as claimed in claim 28, further comprising receiving, on a receiver, said at least one template.

37. The method, as claimed in claim 36, further comprising maintaining at least one item of information in said receiver.

38. The method, as claimed in claim 37, further comprising accessing said at least one item of information.

39. The method, as claimed in claim 36, wherein receiving further comprises at least one instruction capable of registering said at least one template with said receiver.

40. The method, as claimed in claim 36, wherein receiving further comprises at least one instruction capable of calling at least one application programming interface.

41. The method, as claimed in claim 36, wherein receiving further comprises at least one instruction capable of maintaining a user interface for said electronic program guide.

42. The method, as claimed in claim 36, wherein receiving further comprises event handling instructions capable of selecting an event from a plurality of events.

43. The method, as claimed in claim 28, further comprising receiving at least one item of information independent of said at least one template.

44. The method, as claimed in claim 28, further comprising splitting at least one information signal into at least one elementary information stream.

45. The method, as claimed in claim 44, further comprising replacing said at least one elementary information stream with at least one locally generated elementary information stream.

46. The method, as claimed in claim 44, further comprising encoding said at least one elementary information stream into at least one information stream for output.

47. The method, as claimed in claim 28, further comprising introducing at least one locally generated data service into said at least one information stream.

48. The method of claim 28, wherein the template includes an electronic program guide template application.

49. The method of claim 28, wherein the template is a broadcast template received by a receiver.

50. The method, as claimed in claim 28, further comprising encoding the electronic program guide information and private electronic guide information into a television signal suitable for transmission to a television receiver.

51. The method, as claimed in claim 50, further comprising transmitting the television signal encoded with the electronic program guide information and the private electronic guide information via a satellite or via a cable television system.

52. A method comprising:
receiving input from a broadcast server including a broadcast template by a receiver including a data carousel server, the broadcast template having one or more instructions capable of configuring an electronic program guide; and
splitting the input into video, audio, and information streams by the receiver, the information stream including the broadcast template having one or more instructions capable of configuring an electronic program guide;
wherein the electronic program guide information stream includes private electronic program guide information that is intended for use exclusively by one or more select electronic program guides, the private electronic program guide information including at least one of event descriptions, local affiliate information or user selectable information.

53. The method of claim 52, wherein the information stream passes from a decoder and demultiplexer to a local program insertion unit.

54. The method of claim 53, wherein the video, audio, and information streams aforementioned are nationally originated video, audio, and information streams.

55. The method of claim 54, further comprising replacing a portion of the nationally originated video, audio, and information streams with local video, audio, and information streams to form local program insertion unit video, audio, and information streams.

56. The method of claim 52, wherein the electronic program guide information stream is controlled by a first television network and is not able to be accessed by a second television network.

57. The method of claim 55, further comprising passing the local program insertion unit information stream to a data carousel server and a broadcast electronic program guide server.

58. The method of claim 52, further comprising splitting the information stream into an applications stream, a service and tuning stream, and an electronic program guide information stream by a decoder/demultiplexer, the electronic program guide information stream including the broadcast template having one or more instructions capable of configuring an electronic program guide.

59. A system for providing additional electronic program guide information and private electronic program guide information to an electronic program guide including electronic program guide information, comprising:
a broadcast electronic program guide server;
a data carousel server that receives a broadcast template including an electronic program guide template application from the broadcast electronic program guide server, the broadcast template permitting a corresponding broadcaster to control how programs are presented to customers;
a transport decoder and demultiplexer that splits a national feed into real time audio, real time video, and information streams, the information stream including broadcast template;
a local program insertion unit that replaces national information streams with locally originated information streams and provides the locally originated information streams to the broadcast electronic program guide server and the data carousel server, the locally originated information streams comprising the private electronic program guide information; and
a transport encoder and multiplexer that receives audio and video streams from the local program insertion unit and information streams from the data carousel server and encodes said audio and video streams and said locally originated information streams into a television signal suitable for transmission to a television receiver;
wherein the private electronic program guide information includes at least one of event descriptions, local affiliate information or user selectable information and is intended for use exclusively by one or more select electronic program guides.

60. The system of claim 59, wherein the broadcast template is controlled by a television network.

61. The system of claim 59, wherein the broadcast template is access limited.

62. A system for providing additional electronic program guide information comprising:
- a first input configured to receive electronic program guide information from a first broadcaster;
- a second input configured to receive private electronic guide information from a second broadcaster; and
- at least one template comprising one or more instructions capable of configuring an electronic program guide to include the electronic program guide information, the private electronic program guide information, and the additional electronic program guide information;
- wherein the private electronic program guide information includes at least one of event descriptions, local affiliate information or user selectable information and is intended for use exclusively by one or more select electronic program guides.

63. The system, as claimed in claim 62, wherein said template further comprises at least one instruction capable of accessing information.

64. The system, as claimed in claim 62, wherein said template further comprises at least one instruction capable of registering said template with a receiver.

65. The system, as claimed in claim 62, wherein said template further comprises at least one instruction capable of maintaining a user interface for said electronic program guide.

66. The system, as claimed in claim 62, wherein said template further comprises event handling instructions capable of selecting an event from a plurality of events.

67. The system, as claimed in claim 62, wherein said template further comprises at least one instruction capable of calling at least one application programming interface.

68. The system, as claimed in claim 62, wherein said system further comprises a receiver configured to receive said at least one template.

69. The system, as claimed in claim 68, wherein said receiver is further capable of maintaining information and private electronic program guide information.

\* \* \* \* \*